Oct. 29, 1968

C. CAPUTO 3,407,648

GYROSCOPIC DEVICE ADAPTED TO PROVIDE OSCILLATING
STRESSES HAVING ADJUSTABLE AMPLITUDE AND
FREQUENCY PARTICULARLY FOR USE AS
FATIGUE TESTING MACHINE
OF MATERIALS

Filed June 21, 1965

INVENTOR
Carmelo Caputo
BY
Agent

Oct. 29, 1968  C. CAPUTO  3,407,648
GYROSCOPIC DEVICE ADAPTED TO PROVIDE OSCILLATING
STRESSES HAVING ADJUSTABLE AMPLITUDE AND
FREQUENCY PARTICULARLY FOR USE AS
FATIGUE TESTING MACHINE
OF MATERIALS

Filed June 21, 1965  3 Sheets-Sheet 2

INVENTOR
Carmelo Caputo
BY
Agent

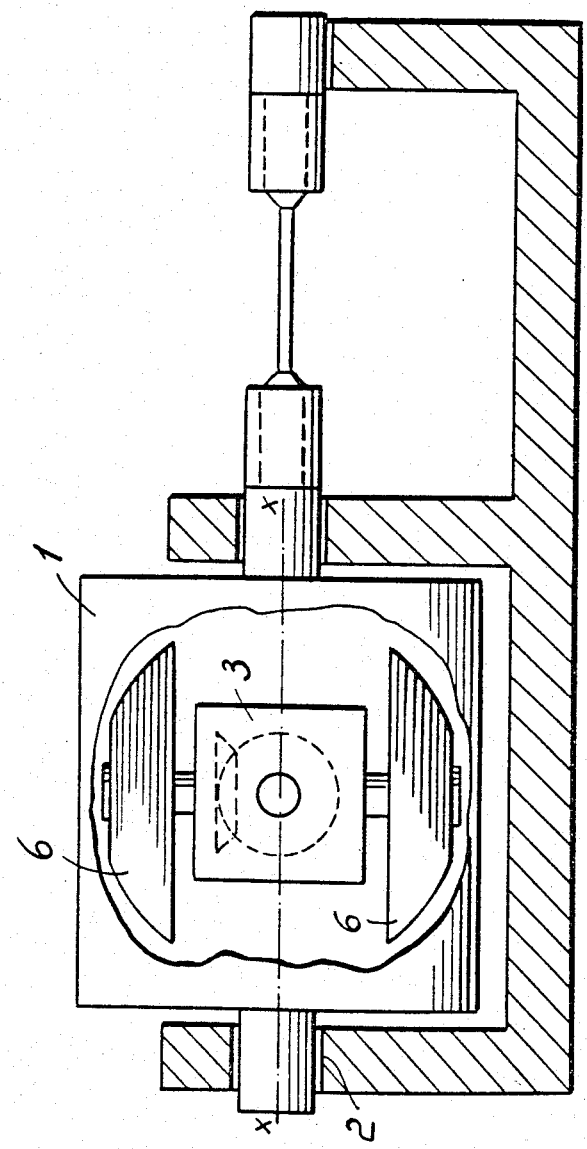

United States Patent Office 3,407,648
Patented Oct. 29, 1968

3,407,648
GYROSCOPIC DEVICE ADAPTED TO PROVIDE OSCILLATING STRESSES HAVING ADJUSTABLE AMPLITUDE AND FREQUENCY PARTICULARLY FOR USE AS FATIGUE TESTING MACHINE OF MATERIALS
Carmelo Caputo, Genoa, Italy, assignor to Carl Schenck Maschinenfabrik G.m.b.H., Darmstadt, Germany
Filed June 21, 1965, Ser. No. 465,666
Claims priority, application Italy, June 23, 1964, 14,144/64; May 26, 1965, 12,223/65
5 Claims. (Cl. 73—67.3)

ABSTRACT OF THE DISCLOSURE

This disclosure relates to a device for creating oscillating stresses with an adjustable amplitude and frequency, comprising three rotatable shafts perpendicular to each other, one of such shafts having rotating flywheel masses which rotate about the axis of said one shaft on which they are supported and rotate also together therewith about another of such perpendicular shafts so that due to the precession couple which is created an oscillation takes place about the third of such perpendicular shafts, which is connected to a specimen to which the oscillations are transmitted.

---

This invention relates to a gyroscopic device adapted to provide oscillating stresses having adjustable amplitude and frequency particularly for use as fatigue testing of materials.

It is the main object of the present invention to provide a gyroscopic device which operates at very high speed with the advantage of having both high maximum value torques with small overall dimensions and a short time required for the tests.

Another object of the invention is to provide an oscillating gyroscopic device which may work in resonance as well as in under-resonance or over-resonance conditions, so that in the former case the torque generated by the device according to the invention is considerably amplified, while by working considerably under the resonance condition, the gyroscopic device concerned operates as a "prescribed stress" machine, and finally by working over the resonance condition the gyroscopic device operates as "prescribed deformation" machine, due to the particular law of dependency of the torque moment on the speed or angular velocity.

In fact in an oscillating system of this kind, when operating in under-resonance conditions, the stresses which are created are called "prescribed stresses" and may be directly determined, and therefrom the corresponding deformations may be calculated. When operating in over-resonance conditions the deformations created in the specimen are called "prescribed deformations" and may be directly determined and the corresponding stresses may be calculated therefrom.

These and still other important objects of the present invention are attained by a gyroscopic device particularly adapted to provide oscillating stresses having adjustable amplitude and frequency characterized in that it comprises a structure free to oscillate around an oscillation axis, at least one rotating mass rotatably supported by said structure and having a spinning axis at right angles with said oscillation axis of said structure, said spinning axis being adapted to rotate around a revolution axis at right angles with said spinning axis, means for causing said spinning axis to rotate around said revolution axis and means for causing said rotating mass to rotate around said spinning axis and means for connecting a specimen to said structure.

Further characteristics features and advantages of the invention will become more apparent in the following detailed description of preferred embodiments, not to be understood in a limiting sense.

Figure 1:
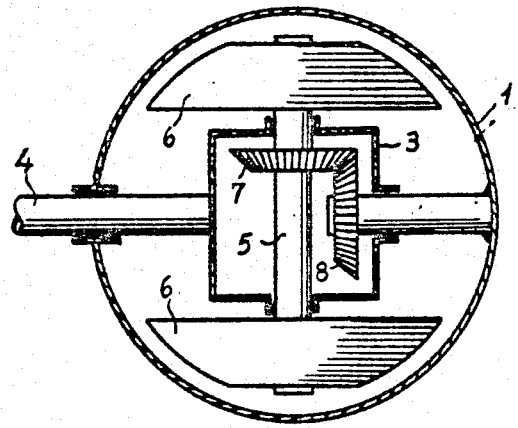
Figure 2:
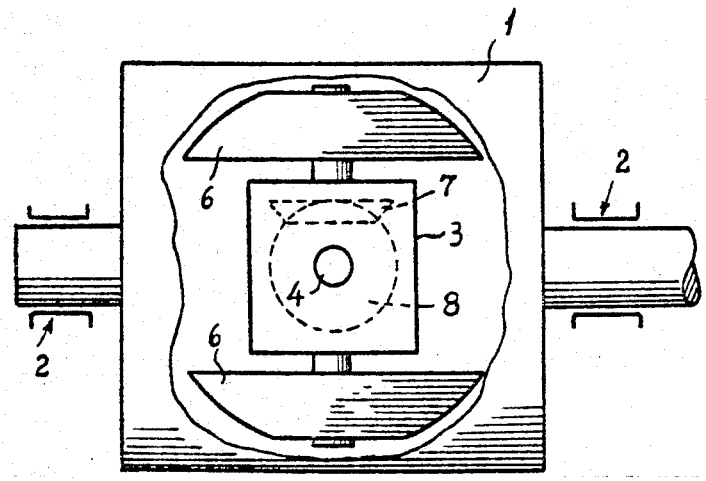
Figure 3:
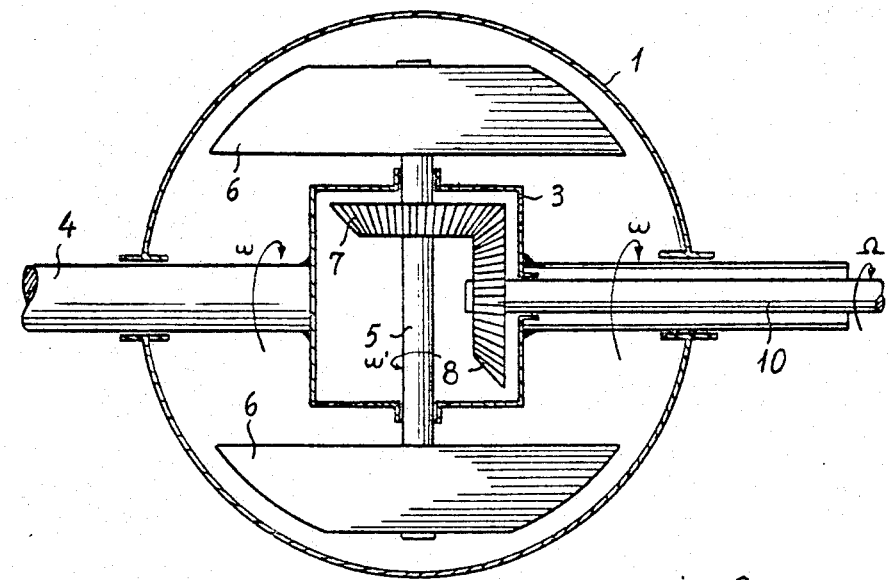
Figure 4:
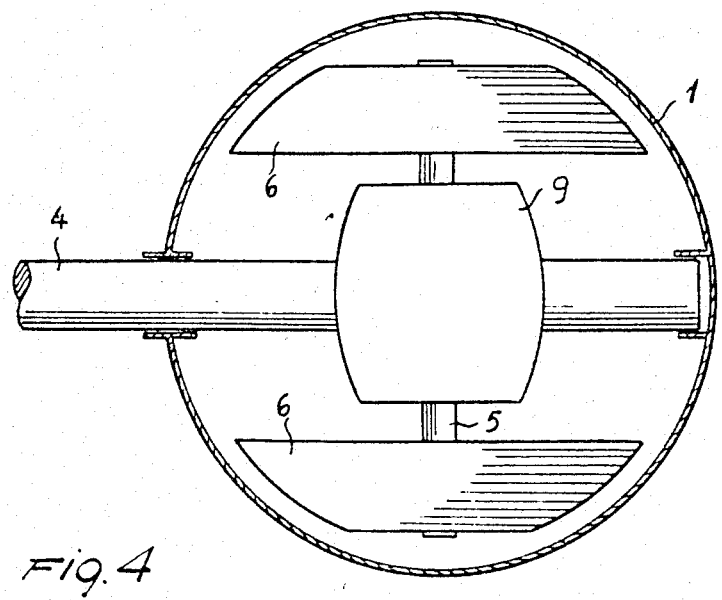

In the drawings:
FIG. 1 is a perspective view according to a transversal plan of the gyroscopic device of the invention;
FIG. 2 is similar to FIG. 1, but in a plane at 90° with respect thereof;
FIGS. 3 and 4 are perspective views of further embodiments of the invention.
FIG. 5 shows means for supporting the device and for connecting it to a specimen.

With reference to the drawings in FIGS. 1 and 2 the housing or casing 1 containing the rotating mechanism is free to oscillate around its geometrical axis $x$ supported on bearings 2.

The casing 1 defines a first body of this device. The axis $x$ is a first axis of the device.

Inside said housing 1 a box 3 is arranged and set in rotation by the driven shaft 4 integral therewith and transversely disposed to the housing axis.

Shaft 4 is coaxial with a second axis of the device. Box 3 is a second body of the device.

Said box accommodates, mounted on special bearings, one shaft 5, at right angles with the shaft 4 and on the extremities of which two flywheels 6 are keyed (FIG. 1). Shaft 5 is coaxial with a third axis of the device. To the shaft 5 the member 7 of a wheelwork (which in the figure consists of a bevel gear drive) is also keyed, the other member 8 of which is integral with the housing.

Member 8 consists of an auxiliary shaft fixed with one end thereof on the casing 1 and with the other end thereof supporting a bevel gear in mesh with the bevel gear 7.

Upon rotation of the shaft 4, and hence of the box 3, the shaft 5 rotates consequently in a plane perpendicular to 4 (i.e. in the plane of FIG. 2) and rotates at the same time also around to its geometrical axis.

The system of the flywheels 6 consequently has two angular velocities proportional to each other and acting in quadrature or perpendicular to each other. This gives rise to a couple of precession proportional to the moment of inertia of the flywheel system and the square of speed of the shaft 4, which develops on an ideal axis perpendicular to shafts 4 and 5.

Since the shaft 5 rotates in the plane of FIG. 2, in the same plane also rotates the ideal axis of the aforementioned torque, so that on the main axis $x$ of the housing a component of such torque is made available the value of which is of a senusoidal nature in time and has as maximum value the one of the couple or moment of precision.

To the housing axis, therefore, as shown in FIG. 5, an oscillating torque is applied, adapted to subject to torsiona fatigue stress a specimen axially arranged in the housing and fixed at the other extremity. Thus, also with the torque concerned a specimen arranged transversely to the housing axis may be subjected to plane bending stress. No comments are required on the possibility of providing traction-compression stresses (by means of an arm fitted to the oscillating system which comprises the housing) and compound stresses.

Advantageously the modulus of the oscillating torque moment applied to the housing may be modified stepwise by providing decomposable flywheels and with continuity by acting on the angular velocity of the shaft 4.

FIGS. 3 and 4 show two further embodiments of the invention, where the revolution motion of the shaft 5 is provided independently of that of the shaft 4. In this case the sinusoidal pulsation component of the precession couple on the shaft 4 has the modulus $$C = J\omega\omega'$$

where J is the moment of inertia of the equipment relating to the shaft 5, $\omega$ the angular velocity of the shaft 4, and $\omega'$ the angular velocity of the shaft 5.

The $\omega$ to $\omega'$ angular velocity ratio being constant (and equal to the transmission ratio of the wheelwork 7, 8), the amplitude of the aforesaid sinusoidal component is, for the previously described embodiment, proportional to the square of $$C = kJ\omega^2$$

and consequently its variation is obtainable both with continuity by modifying $\omega$ and stopwise varying the moment of inertia J.

Since, as mentioned, also the pulsation of the alternating couple is available on the main axis, the aforementioned C dependence upon $\omega$ may be an inconvenience in the device since it does not make it possible to carry out fatigue tests under different stresses at the same frequency.

Accordingly by motorizing the shaft 5, thus eliminating the wheelwork 7, 8, and giving the shaft 4 a constant angular velocity the modulus C is proportional to $\omega$ instead of its square. But also by such solution the interdependence C and $\omega$ is not eliminated.

The problem is instead fully resolved by making the angular velocities $\omega$ and $\omega'$ independent and, by maintaining $\omega$ constant, $\omega'$ is made variable.

Thus, in fact, without having to modify the moment of inertia J, the amplitude of the resulting couple or torque is proportional to $\omega'$ (variable), whilst the work frequency remains equal to $\omega$ (constant).

The solutions for providing the independence between $\omega$ and $\omega'$ and the variability of $\omega'$ are particular modifications of the invention. To this end the wheelwork 7, 8 may be suppressed and the shaft 5 may be motorized with variable angular velocity motor 9 (FIG. 4) through a rigid transmission means, whilst the shaft 4 is powered by a constant angular velocity motor. If the motor 9 is fastened to the housing a flexible connection may be provided.

It is also possible to maintain the device arrangement unchanged (and to retain, therefore, the wheelwork 7, 8), but, instead of fastening the wheel 8 to the housing, it is set in rotation (FIG. 3) at variable speed $\Omega$. It should be clear then that the angular velocity $\omega$ of the shaft 5 will be the $\omega$ and $\Omega$ angular velocity difference, and consequently variable as varies. The shaft 5 is driven by an electric motor, for example (not shown in FIG. 3), through an auxiliary shaft 10 provided rotatable coaxially inside shaft 4. The electric cables for motor 9 pass through shaft 4 and terminate with sliding contact (not shown).

What is claimed is:

1. A device for creating oscillating stresses with an adjustable amplitude and frequency, comprising a first body, supporting means for said body defining a first axis of rotation and allowing an oscillation of said first body about said first axis of rotation, first bearing means in said first body defining a second axis of rotation, a second body supported by said first bearing means rotatably about said second axis of rotation, said second body having a driven shaft coaxial with said second axis of rotation and connectable to a source of rotary motion, second bearing means in said second body and defining a third axis of rotation, a second shaft supported by said second bearing means rotatably about said third axis of rotation, said second shaft having at least one flywheel mass thereon, said second and said third axes of rotation being perpendicular to each other, transmission means engaging said second shaft for imparting a rotary motion to said flywheel mass, said first body having means for connecting a specimen thereto.

2. A device according to claim 1, wherein said transmission means comprise a bevel gear on said second shaft, an auxiliary shaft coaxial with said driven shaft and having another bevel gear in mesh with said bevel gear of said second shaft.

3. A device according to claim 2, wherein said auxiliary shaft is rigid with said first body.

4. A device according to claim 2, wherein said auxiliary shaft is supported rotatably with respect to said first and second bodies and has an end projecting outside said first body and connectable to a second source of motion.

5. A device for creating oscillating stresses with an adjustable amplitude and frequency comprising a casing, supporting means for said casing and defining a first axis of rotation and allowing an oscillation of said casing about said first axis of rotation, first bearing means in said casing defining a second axis of rotation, a first shaft coaxial with said second axis rotatably supported within said casing by said first bearing means, an electromotor on said first shaft, said electromotor having a second shaft defining a third axis of rotation and having ends projecting from opposite sides of said electromotor, said second shaft having flywheel masses on said ends thereof, said second and said third axes of rotation being arranged perpendicular to each other, said casing having means for connecting a specimen thereto.

References Cited

UNITED STATES PATENTS 3,234,783   2/1966   Hanson _____ 73—100

FOREIGN PATENTS 1,308,410   9/1962   France.

RICHARD C. QUEISSER, *Primary Examiner.*

J. P. BEAUCHAMP, *Assistant Examiner.*